Figure 2:
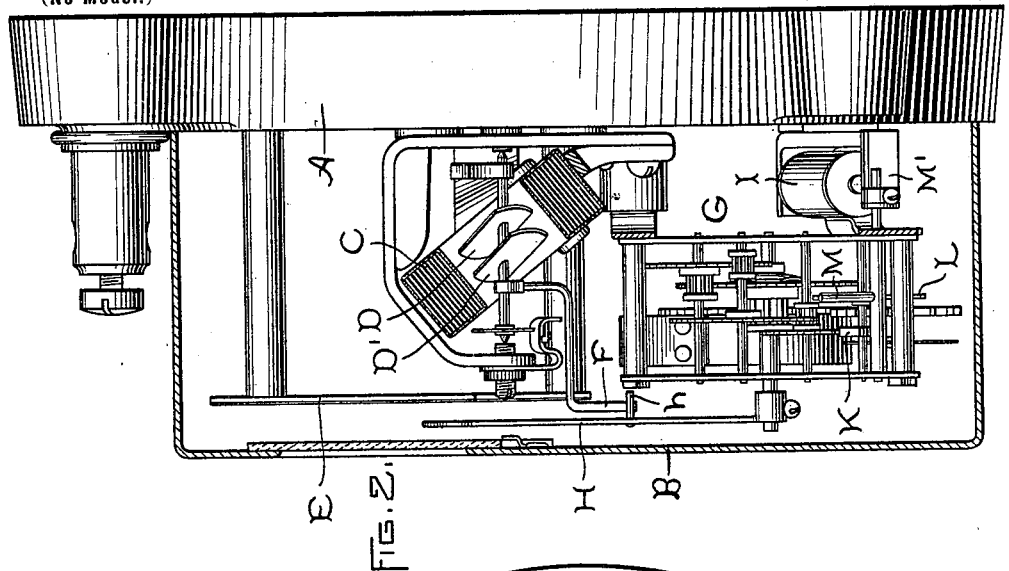

No. 631,289. Patented Aug. 22, 1899.
W. C. FISH.
MAXIMUM DEMAND METER.
(Application filed Mar. 10, 1899.)

(No Model.) 2 Sheets—Sheet 1.

WITNESSES.
A. H. Abell.
A. F. Macdonald.

INVENTOR.
Walter C. Fish,
by Albert G. Davis
Atty.

No. 631,289. Patented Aug. 22, 1899.
W. C. FISH.
MAXIMUM DEMAND METER.
(Application filed Mar. 10, 1899.)
(No Model.) 2 Sheets—Sheet 2.

WITNESSES,
A. H. Abell.
A. F. Macdonald.

INVENTOR.
Walter C. Fish,
by Albert G. Davis,
Atty.

UNITED STATES PATENT OFFICE.

WALTER C. FISH, OF LYNN, MASSACHUSETTS, ASSIGNOR TO THE GENERAL ELECTRIC COMPANY, OF NEW YORK.

MAXIMUM-DEMAND METER.

SPECIFICATION forming part of Letters Patent No. 631,289, dated August 22, 1899.

Application filed March 10, 1899. Serial No. 708,467. (No model.)

*To all whom it may concern:*

Be it known that I, WALTER C. FISH, a citizen of the United States, residing at Lynn, in the county of Essex, State of Massachusetts, have invented certain new and useful Improvements in Maximum-Demand Meters, (Case No. 898,) of which the following is a specification.

My present invention relates to the construction of a new type of the now well-known maximum-demand instruments.

It has for its object to substitute for the class of such instruments which use thermal effects and the displacement of liquids one which is entirely mechanical and is therefore easily kept in order and not liable to the inconveniences attendant upon the use of the old types. While different plans have been proposed for the construction of maximum-demand meters, there are objections to very many of them. One of the principal objections to proposed types has been the absence of any "time constant"—that is to say, in many kinds of such meters an instantaneous flow of current far larger than any normal or usual demand to be supplied by the branch circuit would affect the instrument and give an inequitable basis of charge. For instance, a momentary short circuit in a lamp-socket or other incident of that kind may for a moment cause current to flow far beyond the capacity of the lines to furnish with safety. It is manifestly improper to take such a current-flow as a basis for charge.

A most serious defect in instruments of the thermal class is that they cannot be made standard and yet calibrated for the variations of atmospheric temperature to which they must be subjected. Such variations are very large, 50° or 60° centigrade being not uncommon. This may exist either between two meters of the same type installed in different situations or at the same meter at different times. It is manifest that the only way of compensating for this great defect is by a calculation of more or less intricacy, which will furnish a correction for temperature, and that even this is impossible in most cases. Since all measuring devices are looked upon with suspicion by consumers, they should at least be direct-reading, so that the computation of the charge can be readily tested by persons of ordinary business acquirements. The arrangement of my invention obviates these defects and at the same time furnishes a simple and convenient maximum-demand instrument which may be connected in the circuit with the ordinary recording-wattmeter or with any other preferred form of electrical measuring instrument, so that by inspection at one time the meter-man may get both readings, and by a readily-effected manipulation adjust the maximum-demand instrument to zero.

In its essence the instrument of my invention consists of an indicating ammeter or wattmeter and means for recording the greatest reading existing for a certain predetermined time. The preferred method of accomplishing this is to cause the hand of the ammeter to make contact with the recording-hand used to indicate the maximum demand, thus completing a circuit which, so long as it is maintained, causes a clock to run and move the recording-hand. By adjusting the rate of the clock I may thus vary the time-constant of the instrument to any reasonable extent. As soon as the recording-hand moves away from the hand of the ammeter the clock is stopped. The preferred method of doing this is by including a small magnet in series in a circuit in such manner that when the circuit opens a detent previously held up by the magnet is allowed to fall in the path of some moving part of the clock.

The old type of maximum-demand instrument, which involves the moving of liquid by increase of heat of a thermal device included in the circuit, embodies a very variable time effect. For instance, if a certain current-flow has caused the displacement of part of the liquid into the receiving-chamber commonly employed a very much higher current-flow occurring later will not cause any part of the liquid to enter the chamber until the whole volume of the latter is heated sufficiently to fill the space left vacant by the removal of a part of it and the subsequent cooling of the remainder. In the meantime the maximum flow might change materially or even fall within the previous recorded limit. Thus a substantial flow of current for an appreciable time may go unrecorded. This difficulty, it is manifest, is obviated by my invention, because the movement of the ammeter-needle to its stop on the recording-hand is practically instantaneous, the time-constant being the same for all flows of current within the range of the instrument. And, as already pointed out, this may be adjusted to be anything required. Of course the difficulty pointed out increases in the old construction with the range of the instrument, whereas this is not the case with my invention.

The accompanying drawings show a demand-meter constructed according to the invention.

Figure 1:
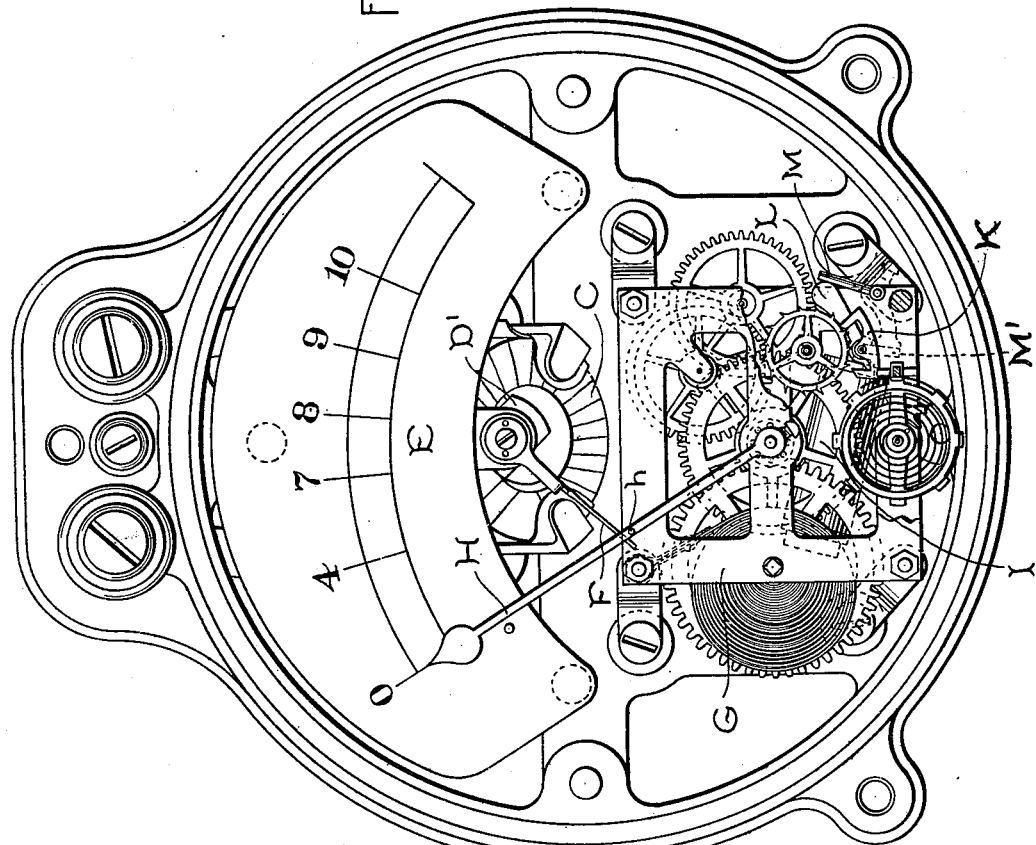
Figure 3:
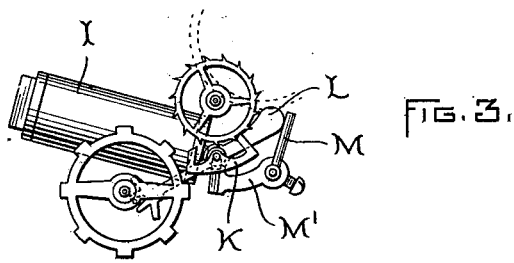
Figure 4:
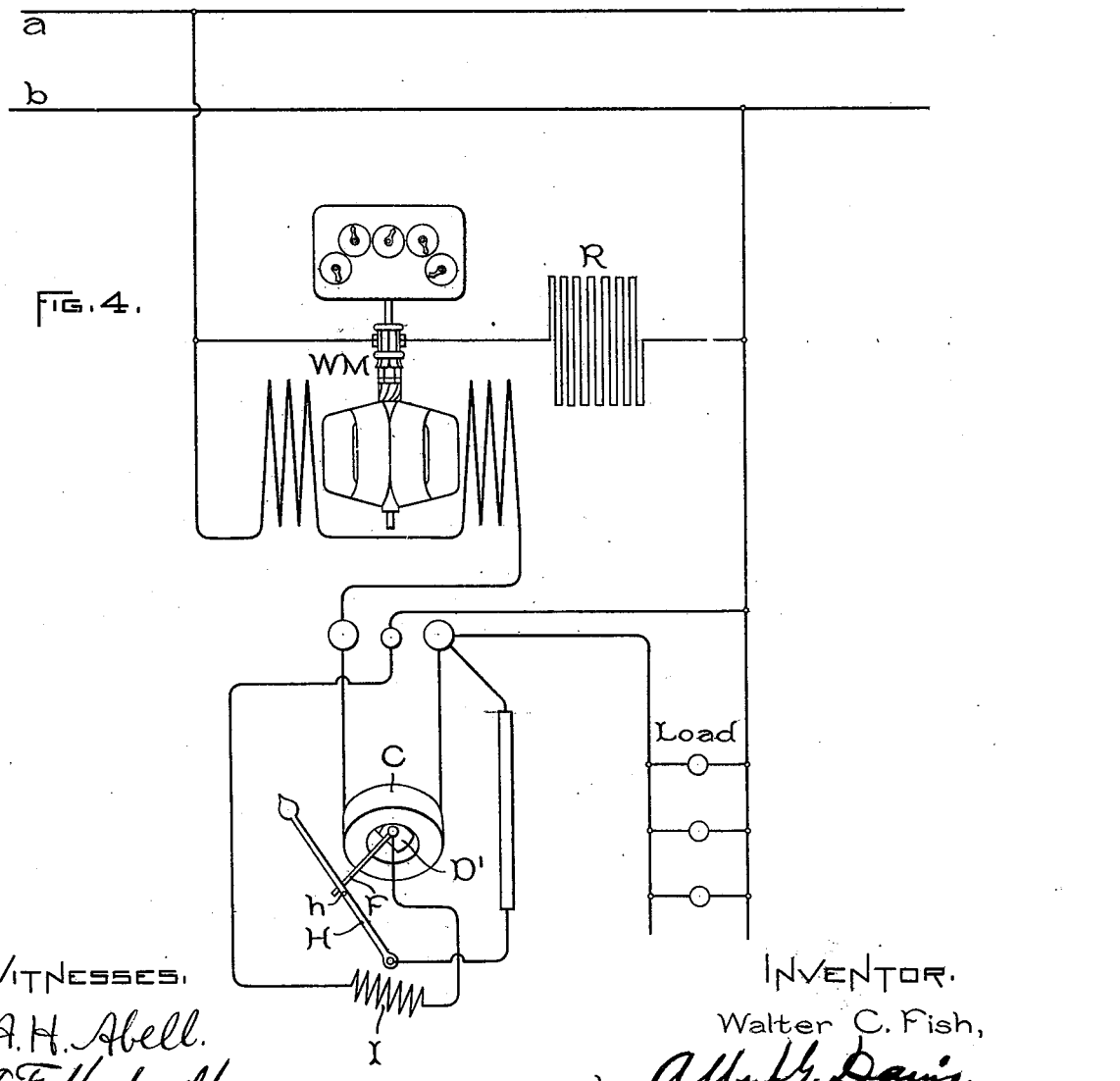

Figures 1 and 2 are respectively a front elevation and a side elevation with parts in section of such an instrument. Fig. 3 is an enlarged detail of a detent for the clock. Fig. 4 is a diagram of the circuits.

In Figs. 1 and 2, A is the base of the instrument, and B is the cover. I have selected for illustration the now well-known inclined coil measuring instrument, such as is described in certain patents to Elihu Thomson, for example, No. 542,663; but nothing in the invention limits me to this selection, as other types could equally well be chosen.

C is the coil through which flows the current to be measured. Of course the instrument may be either a series or a shunt ammeter. In the latter case only a minute part of the total energy supplied to the circuit would be required to run the device, and in circuits of large capacity this would be the preferred form. I have in the present case illustrated the series type.

D D' are two disks or plates of iron, also in an inclined position upon the shaft of the instrument, by the displacement of which the movement of the needle F is effected. This needle is shorter than the ordinary needle of the ammeter and bears against the pin $h$ in the recording-hand H of the instrument when sufficient current passes through it to cause the required displacement. A clockwork G drives the needle H over the scale E. The clock is of the ordinary balance-wheel or marine-escapement type, which is preferred because it is self-starting under ordinary conditions of service. It is manifest that a fly might be substituted for the escapement, although, as this would require a higher gearing, it is not so desirable. The anchor K of the escapement is carried upon and operated by the usual lever L. The detail of this is better understood from Fig. 3. In this, as in the other figures, I is a magnet, the circuit of which will presently be described. The armature M' of the magnet operates a pin M, which when the armature is not attracted bears against the lever L, and thus stops the clock, the weight of the armature being made sufficient for this purpose.

The operation of the device as a whole will be best understood from the diagram of circuits in Fig. 4. In this diagram, $a\ b$ are the mains from which a branch carrying the load is taken. The usual wattmeter W M is indicated, the circuits of which it is unnecessary to describe. The resistance R is of course in series with the armature-circuit of the wattmeter. The parts of the maximum-demand instrument are shown in the lower part of this diagram. Here it will be seen that a circuit through the magnet-coil I from across the mains from any other suitable source is completed whenever the hand F of the ammeter is brought in contact with the pin $h$ in the recording-hand H of the instrument. As will be understood from Fig. 3 in connection with this diagram, the magnet I is then energized, the armature M' is lifted, and the lever L released. The clock then continues to run until it has moved the hand H over a sufficient arc to break the contact at $h$, when the pawl or armature M' drops, stopping the clock.

It is manifest that should the measured current-flow sufficiently diminish, so that the hand of the ammeter takes a different position, the contact at $h$ will be broken and the clock will stop. Upon the occurrence of a great load persisting for an appreciable time the ammeter-needle will again establish the circuit through the magnet and the clock will again start.

What I claim as new, and desire to secure by Letters Patent of the United States, is—

1. The combination of an electromagnetic ammeter with an indicator, and means for advancing the indicator progressively as current is indicated and for stopping its advance when the current indication falls below the maximum already recorded.

2. The combination with an electric measuring instrument, of a recording mechanism, and means actuated by the measuring instrument for starting the recording mechanism, and for stopping it when the electrical indication falls below the maximum already recorded.

3. The combination of an electromagnetic ammeter with a clock and an indicator moved by the clock, with means for starting the clock when the current indication exceeds that recorded by the indicator, and for stopping it when the current indication falls below the record.

4. The combination of an electromagnetic ammeter, with a clock, and an indicator moved by the clock, a circuit completed by a contact operated by both the clock and the ammeter, and a magnet in the circuit operating a detent for the clock; whereby when the ammeter-needle and the clock-indicator complete the circuit, the clock starts and when the circuit is broken, the clock is stopped.

5. In combination, an electromagnetic ammeter, a clock having a marine escapement, and a circuit completed by the clock-hand and the ammeter-needle, including a magnet and a detent operated by the magnet and acting upon the escapement.

In witness whereof I have hereunto set my hand this 6th day of March, 1899.

WALTER C. FISH.

Witnesses:
DUGALD McKILLOP,
CHARLES E. HARTHAN.